March 1, 1960　　　J. E. GREEN　　　2,926,947
BOAT TRANSPORTING TRAILERS
Filed March 19, 1957　　　5 Sheets-Sheet 3

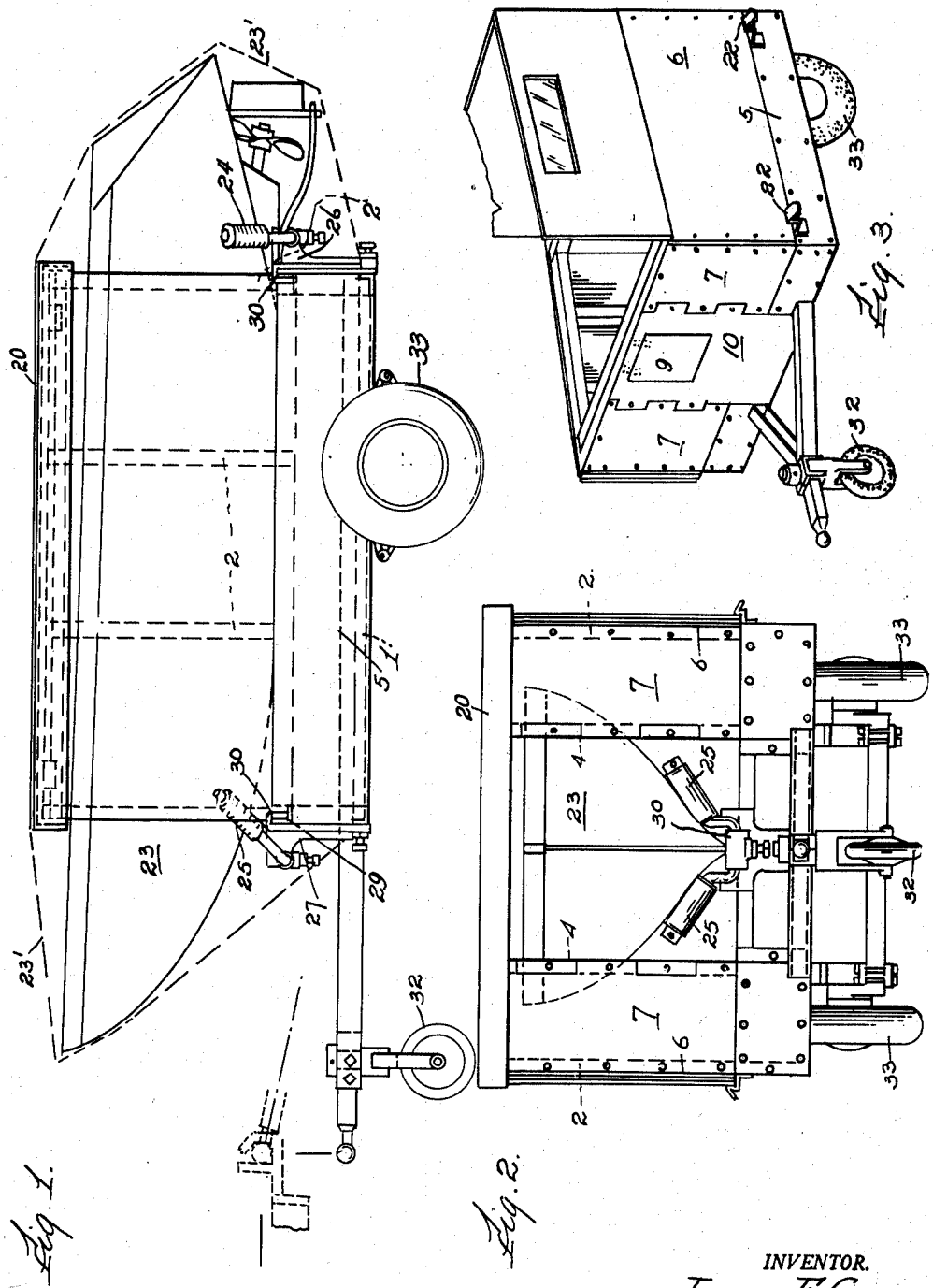

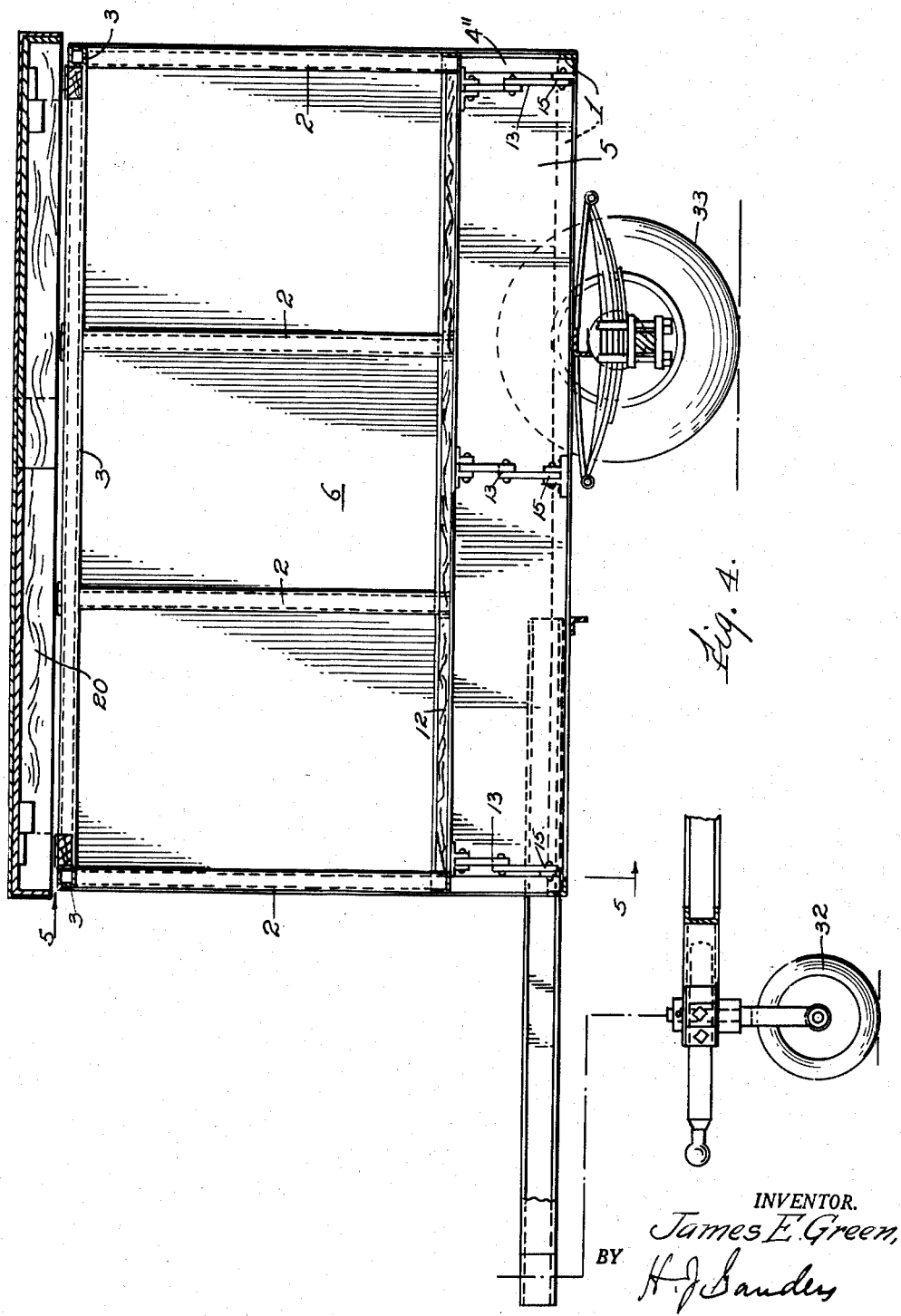

INVENTOR.
James E. Green.
BY H.J. Sanders
Attorney.

March 1, 1960  J. E. GREEN  2,926,947
BOAT TRANSPORTING TRAILERS
Filed March 19, 1957  5 Sheets-Sheet 5
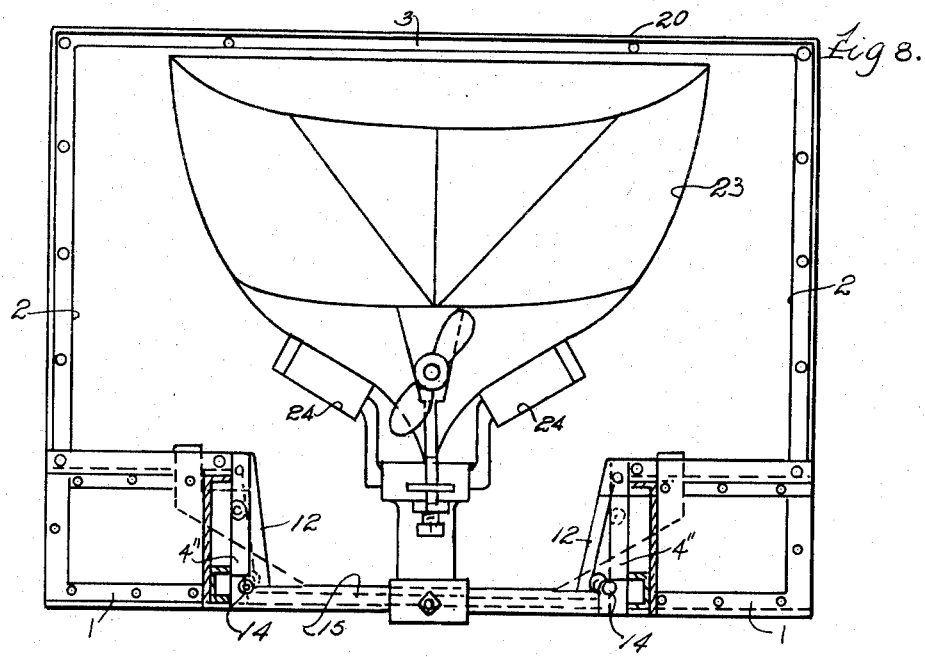
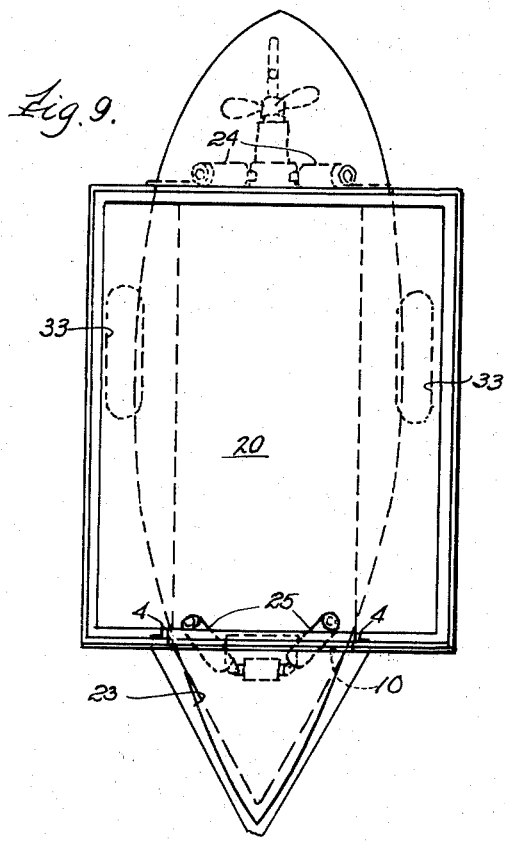
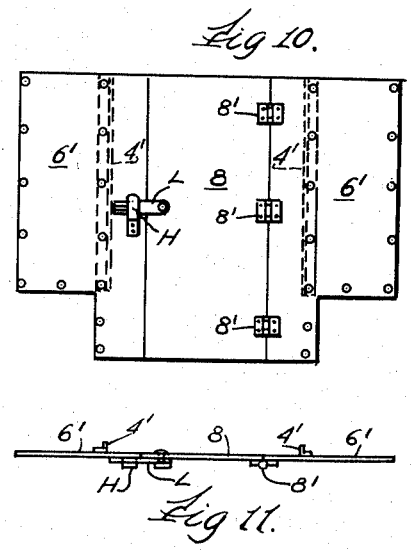
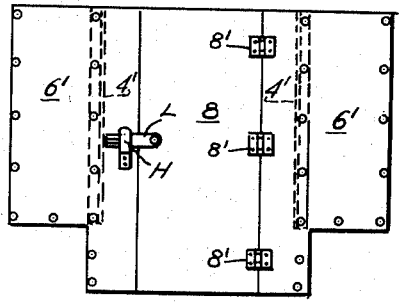
INVENTOR.
James E. Green,

United States Patent Office 2,926,947
Patented Mar. 1, 1960

2,926,947

BOAT TRANSPORTING TRAILERS

James E. Green, Cassopolis, Mich.

Application March 19, 1957, Serial No. 647,011

1 Claim. (Cl. 296—23)

This invention relates to boat trailers for power drawn vehicles and more particularly to a strong, light weight trailer and boat carrier assembly that is inexpensive to manufacture, that carries a boat in a weather protected conveyance, the boat being carried in an upright position ready for unloading and for instant use and that while being carried is to some extent protected from jars and jolts incident to travel over more or less rough roads, and a trailer and boat carrier that has a low center of gravity so that the trailer with the boat is in no danger of toppling when the vehicle is travelling at high speed or when rounding curves or when the brakes are applied to the vehicle and it is brought to a sudden stop.

A further object is to provide a trailer and boat carrier assembly that may be used as a temporary shelter, for sleeping quarters, for serving lunches, for keeping temporarily out of inclement weather and one having means for quickly and easily loading and/or unloading the boat.

A still further object is to provide a trailer and boat carrier assembly that is adapted for convenient use by the average hunter, for trappers, sportsmen, sport enthusiasts, and that due to its simple construction is not easily put out of order, that is durable, and one wherein all parts are readily accessible for inspection, replacement, etc.

A still further object is to provide such an arrangement that may be readily assembled or dismantled by one man, that occupies but a small space, that is substantially built and that requires but little attention in use. With the foregoing and other objects in view the invention consists in the combination and arrangement of parts to be hereinafter fully described, defined in the claim and illustrated in the accompanying drawings forming part of this disclosure and wherein:

Fig. 1 is a view in side elevation of the trailer and boat carrier carrying a boat.

Fig. 2 is a front view of the trailer and boat shown in Fig. 1.

Fig. 3 is a fragmentary view in perspective of the trailer and boat carrier.

Fig. 4 is an enlarged vertical sectional view of the trailer boat carrier taken substantially on the line 4—4 of Fig. 5.

Fig. 8 is a rear elevational view of the body portion of the trailer, the rear panel and other parts removed, and a boat shown arranged in the trailer, supported on rollers.

Fig. 9 is a top view of the invention shown by Fig. 8.

Fig. 10 is an elevational view of the removable rear panel of the trailer, and

Fig. 11 is a top plan view of the removable panel shown by Fig. 10.

Figure 7:
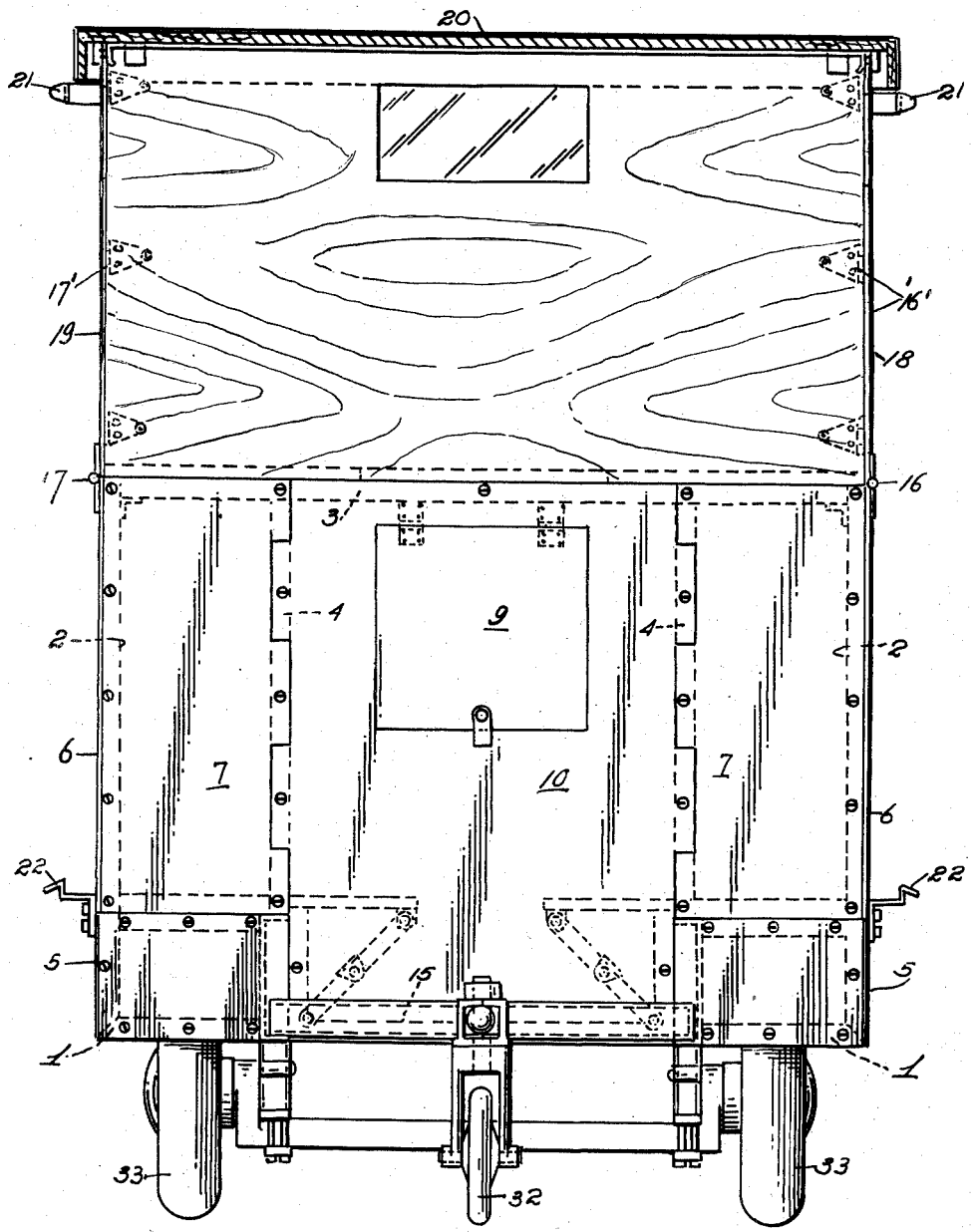
Fig. 7 is a front view of the vehicle, the boat being removed, for use as sleeping quarters, etc.

The desirable oblong frame of the vehicle trailer includes base angle irons 1 that extend along the sides and ends of the same at its base forming side end base rails, and from which vertical side risers, or uprights 2, formed of angle irons, extend upwardly therefrom, said uprights or side risers 2 having secured thereto the top rail members 3, forming side and top rails. Secured as by bolts to the base and top rails 1 and 3 are the side walls 6. A pair of vertical pillars 4 are horizontally spaced and vertically secured between the base and top rails. A pair of front end walls 7 are secured as by bolts between the base and top rails 1 and 3 and between uprights 2 and pillars 4 at opposite sides of said vehicle. A removable panel 10, Fig. 7, is bolted to said pillars 4 and assembled therebetween. Said panel 10 may be disposed inwardly of the vehicle. Said panel 10 is provided with hinged table 9 which may be disposed at right angles thereto when desired, forming a horizontal table supported upon auxiliary legs (not shown), said legs to rest upon the floor boards. A removable 2-piece rear panel assembly 6' is provided with a door 8 and suitable vertical angle iron type supports 4', Figures 5, 10 and 11. Suitable hinges 8' are vertically spaced upon one portion of the panel assembly 6' and hingedly support said door 8. A suitable latch L in combination with a hook H locks said door 8 in closed position and in alignment with the second portion of said panel assembly 6'. Said panel assembly is bolted to said side uprights 2 and a pair of short uprights 4" secured to the base angle irons 1.

Figure 5:
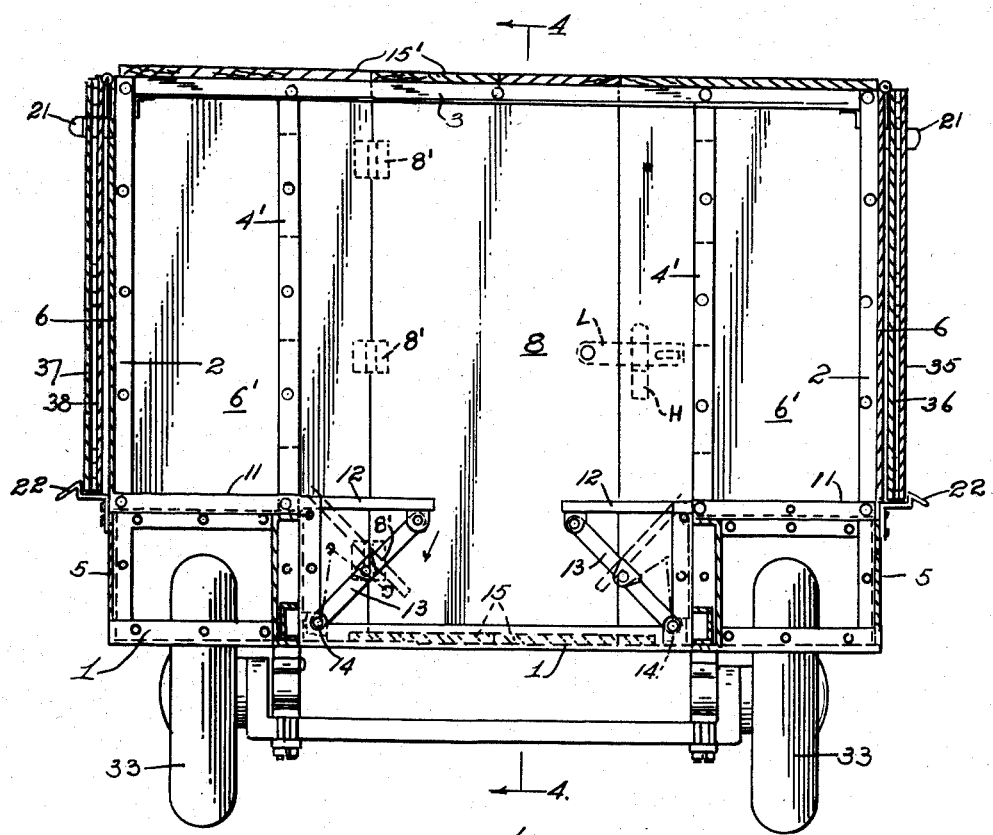
Fig. 5 is a vertical sectional view taken on the line 5—5 of Fig. 4.

Connecting the pillars 4 to the uprights 2 are the horizontally disposed shelves 11 to which are pivotally secured the bed boards 12, spaced from each other to provide an aisle therebetween, each bed supported by hinged sectional braces 13 pivotally connected to brackets 14, a lowered position of said beds 12 denoted in broken lines, Fig. 5. Directly beneath the beds 12 are a plurality of floor boards 15 resting upon angles 1 and upper bed boards 15' supported upon the top rail members 3, said boards 15, 15' extending lengthwise of the vehicle, said boards being desirably removable.

Secured to the side walls of the vehicle by hinges 16, 17 are the top sides 18, 19 that in raised operative position receive the roof 20 that rests thereon and releasably secured in position are the catches 21 secured to said sides 18, 19, the top sides when folded upon each other, as shown in Fig. 5, received and supported in resilient angular brackets 22 carried by the sheathing. When the rear panel roof is in position for travelling and the boat 23 is received in the trailer the boat and vehicle may be covered by a tarpaulin 23'.

Figure 6:
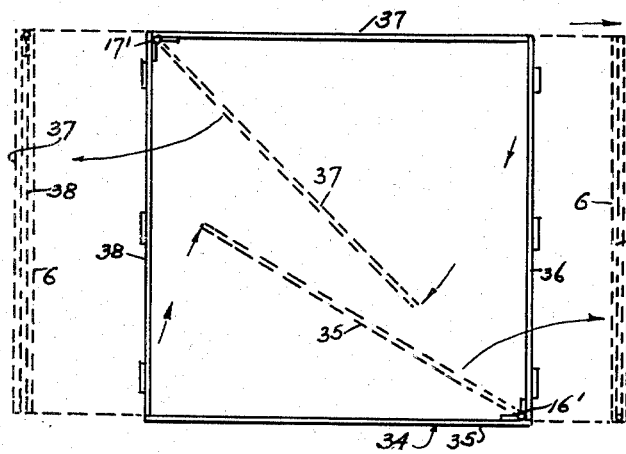
Fig. 6 is a diagrammatic view of the sides of the vehicle in the unfolding or assembling process.

When it is desirable to transport a boat upon the trailer, the front panel 10 is removed, or disposed inwardly of the trailer, and the two-piece rear panel assembly 6' with door 8 is completely removed. The boat is loaded, or introduced from the rear end of the trailer. The front end of the boat will extend through the opening between pillars 4 and the rear end of the boat will extend between the uprights 2 at the rear of the trailer as shown by Figures 1, 8 and 9. The boat will rest upon rollers 24, 25 at the rear and front of the vehicle, said rollers being operatively arranged upon brackets 26, 27 respectively carried by angle pieces 28, 29 secured by brackets 30 to the vehicle body. The vehicle is mounted upon rear wheels 33, and a forward wheel 32. In Fig. 6 a diagrammatic view of the upper portion 34 of the vehicle is shown wherein hinges 16', 17' are shown connecting the top sides 35, 36 and 37, 38 respectively, intermediate positions and folded positions of said sides being denoted in dotted lines.

What is claimed is:

A combination boat carrying and house trailer comprising an oblong base frame, said base frame embodying base side rails and base end rails, an axle having wheels on the ends thereof resiliently mounted to the underside of said base frame, vertical side risers secured to said base side rails, top rail members secured to the upper end of said risers forming an oblong upper frame, said upper frame embodying top side rails and top end rails, lower side walls vertically secured to said side risers between said base frame and said upper frame, a rear panel assembly vertically secured between the rear side risers, a rear door hingedly mounted upon one section of said rear panel assembly, a paid of vertical front pillars horizontally spaced and secured between the front base end rail and the front top end rail, a pair of front panels secured vertically between said front pillars and said side risers, a panel removably and vertically mounted between said front pillars, top side walls hingedly connected by the lower edge portion thereof to the top side rails of the upper frame, a top rear wall hingedly connected by one of its end edge portions to a rear end edge portion of one of said top side walls, a top front wall hingedly connected by one of its end portions to a front end edge portion of the other of said top side walls, said top front wall and said top rear wall adapted to be turned into engagement with said respective top side walls, said top side walls with said top, front and rear walls adapted to be turned downwardly adjacent said lower side walls when used as a trailer, a portable roof adapted to rest upon said top front, top side and top rear rails when they are in a raised position and said roof adapted to rest horizontally upon the upper frame when said top walls are in lowered position, a pair of rollers rotatably mounted on brackets secured to the front end portion of the trailer, and a pair of rollers rotatably mounted on brackets secured to the rear portion of the trailer, said rollers providing loading and supporting means for a boat when transported by the trailer.

References Cited in the file of this patent
UNITED STATES PATENTS

| | | |
|---|---|---|
| 2,669,480 | Messick et al. | Feb. 16, 1954 |
| 2,772,912 | Neff | Dec. 4, 1956 |
| 2,797,008 | Banker | June 25, 1957 |